United States Patent
Song et al.

(10) Patent No.: US 7,487,303 B2
(45) Date of Patent: Feb. 3, 2009

(54) FLASH MEMORY DEVICE AND ASSOCIATED DATA MERGE METHOD

(75) Inventors: Dong-Hyun Song, Yongin-si (KR); Chan-Ik Park, Seoul (KR); Sang-Ryul Min, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 362 days.

(21) Appl. No.: 11/319,281

(22) Filed: Dec. 29, 2005

(65) Prior Publication Data

US 2006/0179263 A1 Aug. 10, 2006

(30) Foreign Application Priority Data

Feb. 4, 2005 (KR) ............ 10-2005-0010750

(51) Int. Cl.
*G06F 12/00* (2006.01)
(52) U.S. Cl. ............... 711/154; 711/103; 711/205; 711/209
(58) Field of Classification Search ......... 711/103, 711/154, 205, 209
See application file for complete search history.

(56) References Cited

U.S. PATENT DOCUMENTS

| | | | |
|---|---|---|---|
| 5,890,192 A * | 3/1999 | Lee et al. | 711/103 |
| 6,985,992 B1 * | 1/2006 | Chang et al. | 711/103 |
| 7,039,788 B1 * | 5/2006 | Chang et al. | 711/203 |
| 7,234,036 B1 * | 6/2007 | Chang et al. | 711/202 |
| 2002/0184436 A1 | 12/2002 | Kim et al. | |
| 2004/0083405 A1 * | 4/2004 | Chang et al. | 714/24 |

FOREIGN PATENT DOCUMENTS

| | | |
|---|---|---|
| JP | 2003-015928 | 1/2003 |
| JP | 2003308234 | 10/2003 |
| JP | 2004-118989 | 4/2004 |
| KR | 1020000067341 | 11/2000 |
| KR | 1020010110073 A | 12/2001 |
| KR | 1020020092487 | 12/2002 |
| KR | 1020030061948 A | 7/2003 |
| WO | WO 02/058074 * | 7/2002 |

OTHER PUBLICATIONS

Kim et al., 'A Space-Efficient Flash Translation Layer for Compactflash Systems', Apr. 10, 2002, IEEE Transactions on Consumer Electronics, Vol. 48, No. 2 May 2002.*

* cited by examiner

*Primary Examiner*—Reba I Elmore
(74) *Attorney, Agent, or Firm*—Volentine & Whitt, PLLC (57) ABSTRACT

A memory system comprises a flash memory and a controller comprising a control logic circuit and a working memory storing a flash translation layer. The memory system performs a merge operation by selectively copying a page from a first block of the flash memory to a second block of the flash memory. Where the page is valid and marked as allocated according to a file allocation table stored in the flash memory, the page is copied to the second block. However, where the page is valid and marked as deleted in the file allocation table, the page is not copied to the second block.

15 Claims, 6 Drawing Sheets

Fig. 1

(PRIOR ART)

Fig. 2A (PRIOR ART)

| PPN | PBN0 | LPN |
|---|---|---|
| 0 | ✕ | 0 |
| 1 | ✕ | 1 |
| 2 | | 2 |
| 3 | | 1 |
| 4 | | 0 |
| 5 | | 3 |

| PPN | PBN1 | LPN |
|---|---|---|
| 10 | ✕ | 0 |
| 11 | | 1 |
| 12 | | 2 |
| 13 | | 3 |
| 14 | | 0 |
| 15 | | |

Fig. 2B (PRIOR ART)

<Before Merging>

| PPN | LPN |
|---|---|
| 0 | 0 |
| 1 | 1 |
| 2 | 2 |
| 3 | 1 |
| 4 | 0 |
| 5 | 3 |

<After Merging>

| LPN | PPN |
|---|---|
| 0 | 14 |
| 1 | 11 |
| 2 | 12 |
| 3 | 13 |
| 4 | NA |
| 5 | NA |

(NA : Not Allocated)

FLASH MEMORY DEVICE AND ASSOCIATED DATA MERGE METHOD

BACKGROUND OF THE INVENTION

1. Field of the Invention

Embodiments of the present invention relate generally to a flash memory device. More particularly, embodiments of the invention relate to flash memory device and an associated data merge method.

A claim of priority is made to Korean Patent Application No. 2005-10750, filed on Feb. 4, 2005, the disclosure of which is hereby incorporated by reference in its entirety.

2. Discussion of Related Art

Nonvolatile memory can be found in a wide variety of consumer and industrial electronic devices, such as personal computers, personal digital assistants, laptops, cellular phones, and cameras, to name but a few. Nonvolatile memory is particularly useful because of its ability to retain stored data even when power is cut off. One of the more popular forms of nonvolatile memory is flash memory. Some of the advantages of flash memory include its speed of operation, its ruggedness, and low power consumption.

Conventional memory systems such as hard disks and floppy disk drives are not as rugged or power efficient as flash memory because they have moving parts that can be easily damaged. As a result, some conventional computer systems are replacing hard disk drives and floppy drives with flash memories.

Unfortunately, replacing a conventional disk drive with flash memory is not entirely straightforward. One reason is because data stored in a conventional disk drive can be overwritten in its current location, but data stored in a flash memory cannot be overwritten without first erasing an entire block of data. In other words, conventional disk drives have "write in place" capability, whereas flash memory does not. As a result, when a flash memory is required to coordinate with a host system that uses the memory access conventions of a conventional disk drive, the flash memory typically uses a flash translation layer (FTL), which is a driver that reconciles a logical address space used by the operating system with a physical address space used by the flash memory.

The flash translation layer generally performs at least three functions. First, it divides the flash memory into pages that can be accessed by the host system. Second, it manages data stored in the flash memory so that the flash memory appears to have write in place capability, when in reality, new data is written to erased locations of the flash memory. Finally, the flash translation layer manages the flash memory so that erased locations are available for storing new data.

Managing the flash memory involves various operations. For example, whenever a logical address is overwritten, a page of data stored at a corresponding physical address is invalidated and new page of data is stored at a new physical address of the flash memory. Whenever a sufficient number of pages in the flash memory are invalidated, the FTL performs a "merge" operation whereby "valid" pages are transferred from source blocks containing invalid pages to destination blocks with available space. The purpose of the merge operation is to free up memory space occupied by invalidated blocks by erasing the source blocks.

The above operations describe how a FTL typically works. A variety of different address translation schemes are disclosed, for example, in U.S. Pat. No. 5,404,485, U.S. Pat. No. 5,937,425, and U.S. Pat. No. 6,381,176.

A more detailed description of FTL operations is presented below in the context of an electronic device comprising a host system connected to a flash memory. The flash memory comprises a plurality memory cells arranged in a memory cell array. The memory cell array is divided into a plurality of blocks, and each of the blocks is divided into a plurality of pages. The flash memory can be erased a block at a time, and it can be programmed or read a page at a time. However, once programmed, a page must be erased before it can be programmed again.

Within a flash memory, each block is designated by a physical block address, or "physical block number" (PBN) and each page is designated by a physical page address, or "physical page number" (PPN). However, the host system accesses each block by a logical block address, or "logical block number" (LBN) and each page by a logical page address, or "logical page number" (LPN). Accordingly, to coordinate the host system with the flash memory, the FTL maintains a mapping between the logical block and page addresses and corresponding physical block and page addresses. Then, when the host system sends a logical block and page address to the flash memory, the FTL translates the logical block and page address into a physical block and page address.

As mentioned previously, a merge operation is performed to consolidate valid pages within the flash memory, thereby freeing up space where invalid pages are located. When the merge operation is performed, the FTL must maintain correct mappings between physical and logical block and page addresses. A merge operation typically comprises one or more of the following operations: a block mapping operation, a page mapping operation, and a log mapping operation.

Figure 1:
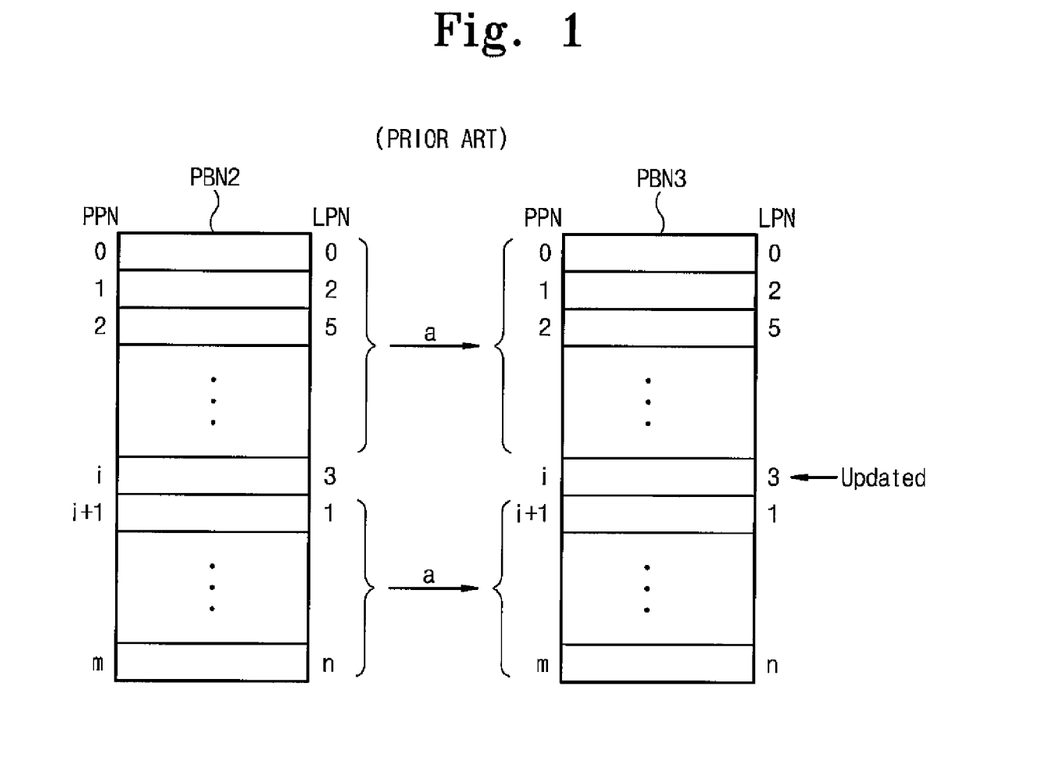
FIG. 1 is a block diagram illustrating a block mapping operation in a conventional flash memory system.

An exemplary block mapping operation is described below in relation to FIG. 1. Intuitively, a block mapping operation is simply a mapping of valid data contained in one block onto another block. One reason to perform a block mapping operation is to update a page within the block while maintaining the same relative locations for the pages. In FIG. 1, one page of a block is updated, and then all pages within the block are transferred to another block. When a block mapping operation occurs, a block mapping table keeping track of mappings between logical block numbers and physical block numbers is updated by the FTL.

Referring to FIG. 1, first and second blocks with respective physical block numbers PBN2 and PBN3 each comprise a plurality of pages. Data stored in an math "$i^{th}$" page of the first block is updated by programming a corresponding "$i^{th}$" page in the second block with new data while invalidating the "$i^{th}$" page in the first block. Then, all valid pages in the first block are transferred to the second block. The transfer of the valid pages is denoted in FIG. 1 by the symbol □. Once all pages in the first block have been transferred to the second block, the first block is erased.

Figure 2A:
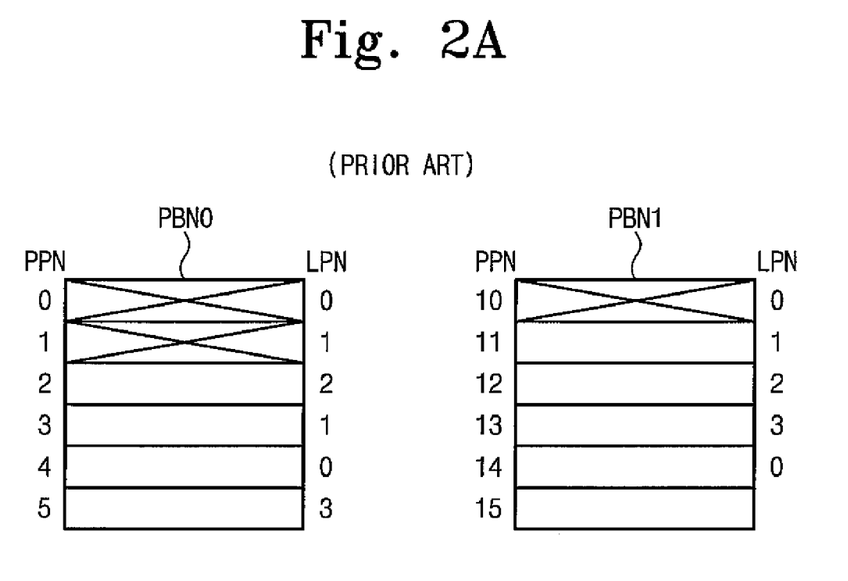
FIG. 2 is a block diagram illustrating a page mapping operation in a conventional flash memory system.
Figure 2B:
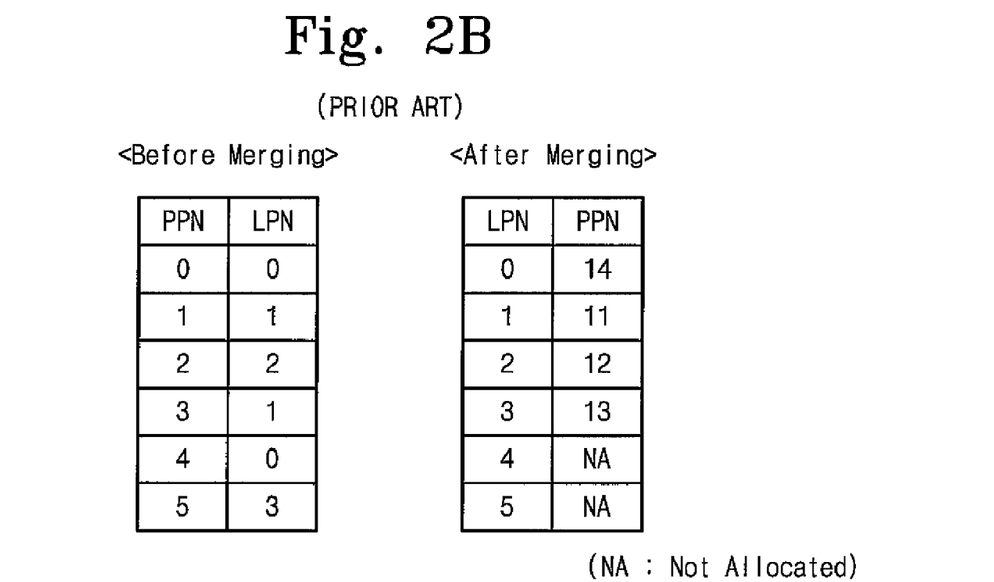

FIG. 2 illustrates an exemplary page mapping operation. In a page mapping operation, pages are transferred to different physical page numbers and the FTL updates a page mapping table to keep track of correspondences between logical and physical page numbers. FIG. 2A shows two memory blocks of a flash memory and FIG. 2B shows a page mapping table for the flash memory.

In FIG. 2, first and second program operations have been performed with each of logical page numbers 0 and 1. In the first program operations, logical page number 0 mapped to physical page number 0 and logical page number 1 mapped to physical page number 0. In the second program operations, logical page number 0 mapped to physical page number 4 and logical page number 1 mapped to physical page number 3. As a result, pages of data stored at physical page numbers 0 and 1 are invalidated, as illustrated by crossed out boxes in FIG. 2A.

To free up the memory space at physical page numbers 0 and 1, the page mapping operation transfers pages of data from a first block with physical block number PBN0 to a second block with physical block number PBN1. As a result, pages of data stored in the first block are stored at new physical page numbers in the second block while keeping the same logical page numbers. Then, once all valid data is transferred from the first block to the second block, the first block is erased.

FIG. 3 illustrates a log mapping operation, wherein pages of data from two different blocks are transferred to a single block. Referring to FIG. 3, a flash memory is divided into a data region, a log region, and a meta region.

Figure 3A:
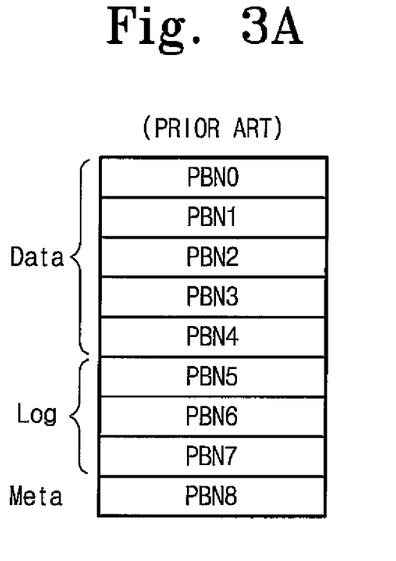
FIG. 3 is a block diagram illustrating a log mapping operation in a conventional flash memory system.

The memory block shown in FIG. 3A comprises first through ninth physical memory blocks PBN0 through PBN8. Memory blocks PBN0-PBN4 are located in the data region, memory blocks PBN5-PBN7 are located in the log region, and a memory block PBN8 is defined in the meta region. It is assumed that memory blocks PBN5 and PBN6 in the log region correspond to respective memory blocks PBN0 and PBN2 and memory block PBN8 in the meta region is designated as an empty memory block.

Where the host system initiates a program operation for a page in memory block PBN0, data is programmed in a corresponding page in log block PBN5. However, where the host system initiates a program operation for a page in memory block PBN1, no corresponding block exists in the log region. Accordingly, to create space for a block corresponding to memory block PBN1, memory block PBN5 and PBN0 are merged by a log mapping operation.

Figure 3B:
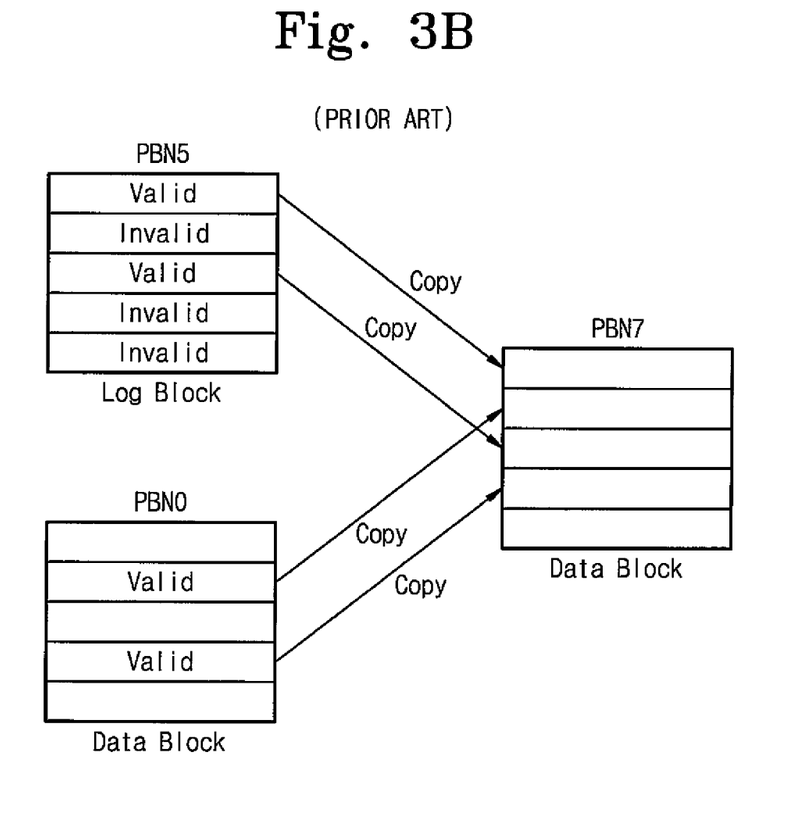

In the log mapping operation, as illustrated in FIG. 3B, valid pages in memory blocks PBN5 and PBN0 are transferred to corresponding locations in a memory block PBN7. In the log mapping operation, the FTL maintains a mapping table to keep track of the correspondences between logical and physical addresses of the blocks and pages in the flash memory.

One problem with conventional merge operations is that the host system can not determine when a merge operation occurs, since merge operations are determined by operations of the FTL which are transparent to the host system. Since FTL does not store information about a file system, such as a file allocation table, the FTL can not determine whether the host system considers a page invalid. Accordingly, in some instances, a file system for the host system may mark certain pages for deletion without the awareness of the FTL. As a result, a merge operation performed by the FTL may copy pages that are invalid from the host system's point of view. As a result, the merge operation takes more time than it should, thus degrading the performance of the memory system.

SUMMARY OF THE INVENTION

According to one embodiment of the invention, a memory system is provided. The memory system comprises a flash memory adapted to store file allocation table (FAT) information, and a controller adapted to read the FAT information and perform a merge operation.

According to another embodiment of the invention, a method of performing a merge operation in a flash memory system comprising a flash memory and a controller is provided. The method comprises reading a file allocation table (FAT) information from a FAT region of the flash memory, and selectively copying a page from a first block in the flash memory to a second block in the flash memory based on the FAT information.

BRIEF DESCRIPTION OF THE DRAWINGS

The invention is described below in relation to several embodiments illustrated in the accompanying drawings. Throughout the drawings like reference numbers indicate like exemplary elements, components, or steps. In the drawings.

DESCRIPTION OF EXEMPLARY EMBODIMENTS

Exemplary embodiments of the invention are described below with reference to the corresponding drawings. These embodiments are presented as teaching examples. The actual scope of the invention is defined by the claims that follow.

Figure 4:
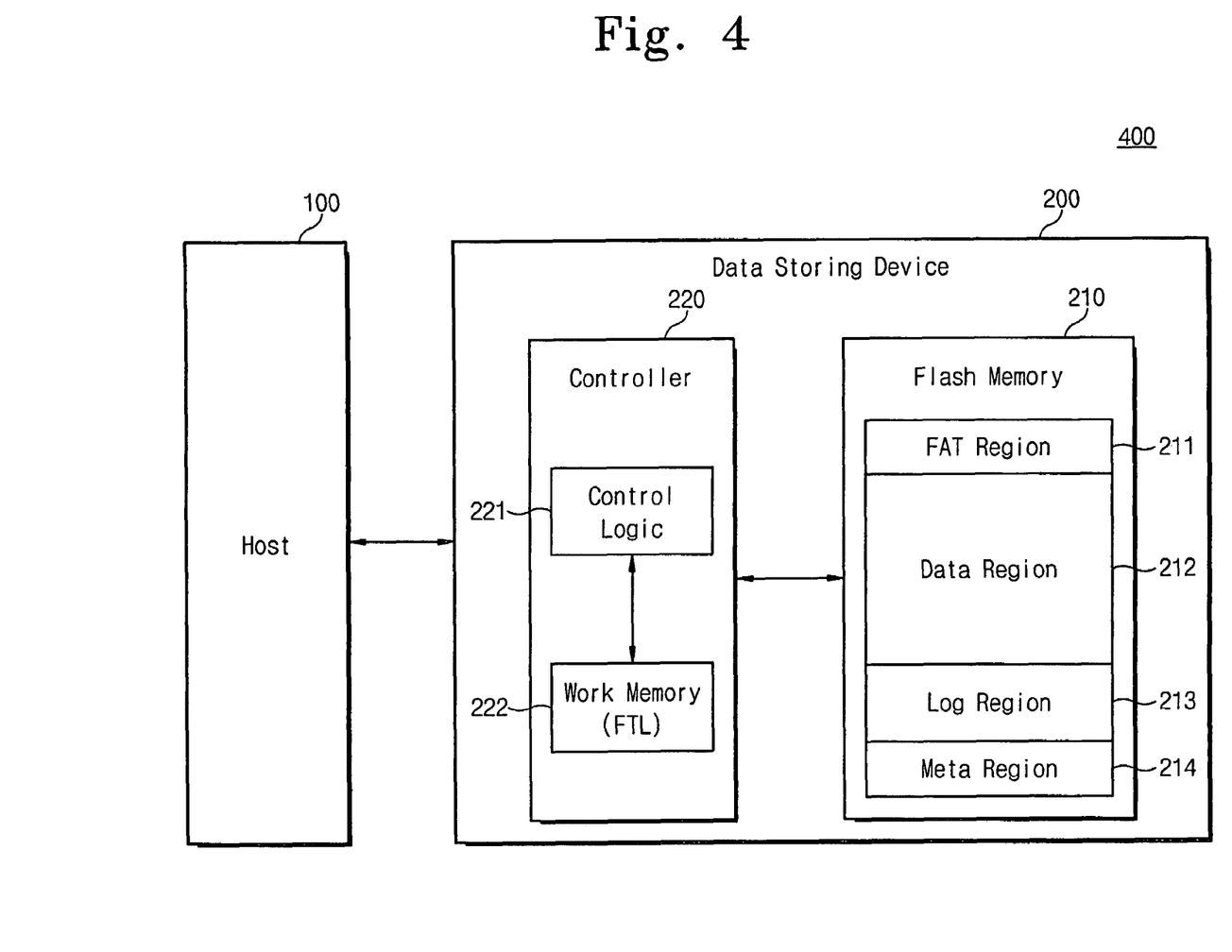
FIG. 4 is a block diagram of an electronic device comprising a host system and a flash memory system according to an embodiment of the present invention.

FIG. 4 is a block diagram of an electronic device 400 according to one embodiment of the invention. Referring to FIG. 4, electronic device 400 comprises a host system 100 and a memory system 200. Memory system 200 comprises a flash memory 210 and a controller 220 for interfacing between flash memory 210 and host system 100.

Flash memory 210 comprises a plurality of memory cells arranged in a memory cell array. The memory cell array is divided into a plurality of blocks, and each block is divided into a plurality of pages. Each page comprises a plurality of memory cells sharing a common wordline. Flash memory 210 is erased a block at a time, and read or programmed a page at a time. However, pages of flash memory 210 can only be programmed when in an erased state. In other words, flash memory 210 does not have "write in place" capability. Typically, flash memory 210 comprises a NAND flash memory.

Host system 100 accesses memory system 200 as if it were a conventional hard disk with write in place capability. Since flash memory 210 does not have write in place capability, controller 220 comprises a flash translation layer (FTL), which gives host system 100 the appearance of write in place capability while actually programming data to different pages of flash memory 210.

Flash memory 210 comprises a file allocation table (FAT) region 211 storing a file allocation table, a data region 212, a log region 213, and a meta region 214.

Log region 213 comprises a plurality of log blocks 213 corresponding to a plurality of respective data blocks in data region 212. Accordingly, when host system 100 initiates a program operation for a data block in data region 212, data for the program operation is programmed in a corresponding log block of log region 213.

Where a data block in data region 212 does not have a corresponding log block in log region 213, or where there is no empty page in a log block in log region 213, or where a host makes a merge request, a merge operation is performed. In the merge operation, valid pages of data blocks and corresponding log blocks are copied to new data and log blocks. Once the merge operation is performed, mapping information for logical addresses and physical addresses of flash memory 210 are stored in meta region 214.

Controller 220 is configured to control memory system 200 when host system 100 performs a memory access operation. As shown in FIG. 4, controller 220 comprises a control logic circuit 221 and a working memory 222. The FTL is stored in working memory 222. When host system 100 initiates a memory access operation, control logic circuit 221 controls the FTL.

Figure 5:
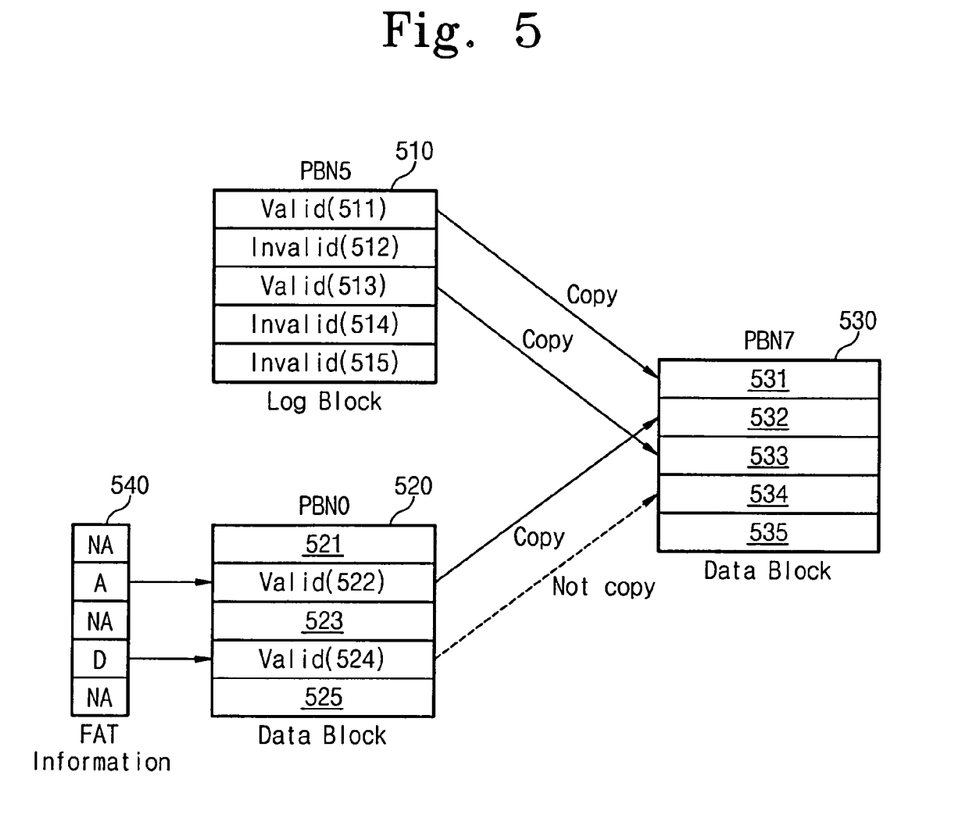
FIG. 5 is a block diagram illustrating a method of performing a merge operation in a flash memory system according to an embodiment of the present invention.

FIG. 5 is a block diagram illustrating a method of performing a merge operation in memory system 200 according to an embodiment of the present invention. Referring to FIG. 5, valid pages 511 and 513 of a log block 510 and a valid page 522 of a data block 520 are copied to a new data block 530. Pages 511 and 513 are respectively copied to pages 531 and 533 of data block 530, and page 522 is copied to a page 532 of data block 530. A valid page 524 in data block 520 is not copied to data block 530 based on FAT information 540 stored in FAT region 211.

FAT information 540 indicates whether pages of data in data block 520 have been allocated by host system 100 or whether the pages have been marked for deletion. For instance, pages 521, 523, and 525 in data block 520 do not store any data, and therefore they are marked as Not Allocated (NA) in FAT information 540. On the other hand, page 522 stores valid data, so it is marked as allocated (A). Page 524, however, stores valid data, but it is regarded by the host system as a deleted page, and therefore it is marked as Deleted (D). Since the host system regards page 524 as deleted, page 524 is not copied to block PBN7 in a merge operation.

Figure 6:
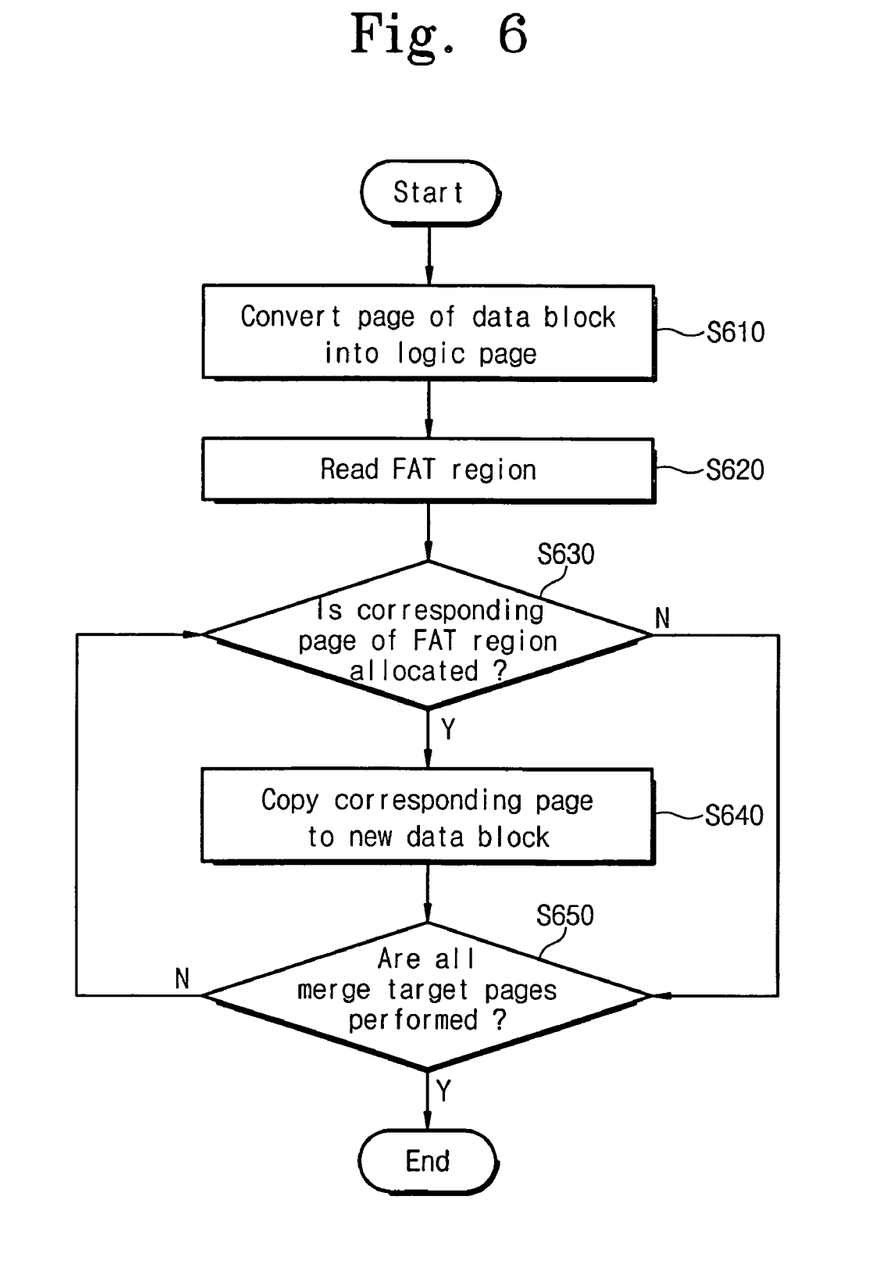
FIG. 6 is flowchart illustrating a selective merge method for a flash memory system according to an embodiment of the present invention.

FIG. 6 is flowchart illustrating a method of performing a merge operation according to an embodiment of the present invention. The method is described in relation to the system illustrated in FIGS. 4 and 5. In the following description, exemplary method steps are denoted by parentheses (XXX) to distinguish them from exemplary system elements, such as those shown in FIG. 4.

Referring to FIG. 6, the method comprises converting a physical page of data block 530 into a logical page (S610), or in other words, associating an appropriate logical address used by host system 100 with data block 520. The method further comprises reading FAT information 540 stored in FAT region 211 using the FTL (S620). The method further comprises determining whether a page in data block 520 corresponding to the logical page in data block 530 is valid and determining whether the page in data block 520 is allocated according to FAT information 540 (S640). Where the page in data block 520 is a not allocated or it is marked for deletion in FAT information 540, the page is not copied to data block 530. In contrast, where the page in data block 520 is valid and allocated according to FAT information 540, the data block is copied to data block 530 (S640). After determining whether the page in data block 520 is valid or allocated, the method determines whether all pages in data block 520 have been checked by step S630 (S650). Where all of the pages in data block 520 have been checked, the method terminates. Otherwise, steps S630, S640, and S650 are repeated.

The method illustrated in FIG. 6 prevents data that has been marked for deletion by the host system from being copied to another memory block in a merge operation. As a result, the time required to perform the merge operation is reduced, and the overall efficiency of the memory system improves.

For example, referring to FIG. 5, assume that the number of valid/allocated pages in log block 510 is "x", the number of valid/deleted pages is "y", and the time required to copy one page is "z". The total time required to perform a merge operation where the valid/deleted pages are copied is therefore $(x+y)*z$. However, by not copying the valid/deleted pages, the time to perform a merge operation is reduced by $y*z$.

The foregoing preferred embodiments are teaching examples. Those of ordinary skill in the art will understand that various changes in form and details may be made to the exemplary embodiments without departing from the scope of the present invention as defined by the following claims.

What is claimed:

1. A memory system, comprising:
    a flash memory adapted to store a file allocation table (FAT) containing FAT information; and
    a controller adapted to read the FAT information and selectively copy data stored in a first block of the flash memory to a second block of the flash memory based on the FAT information during a merge operation.

2. The system of claim 1. wherein the controller selectively copies data from the first block to the second block on a page by page basis.

3. The system of claim 2, wherein, where the FAT information indicates that a page of data in the first block is allocated, the controller copies the page to the second block.

4. The system of claim 2, wherein, where the FAT information indicates that a page of data in the first block is deleted, the controller does not copy the page to the second block.

5. The system of claim 1, wherein the controller comprises a working memory adapted to store a flash translation layer (FTL) for reading the FAT information and performing a merge operation.

6. The system of claim 5, wherein the flash memory comprises a NAND flash memory.

7. The system of claim 1, wherein the flash memory and the controller are located in a memory card.

8. A method of performing a merge operation in a flash memory system comprising a flash memory and a controller, the method comprising:
    reading file allocation table (FAT) information from a FAT region of the flash memory; and
    selectively copying a page from a first block in the flash memory to a second block in the flash memory based on the FAT information.

9. The method of claim 8, further comprising:
    before reading the FAT information, converting a page of the second block into a logical page.

10. The method of claim 8, wherein selectively copying the page from the first block to the second block comprises:
    determining whether the page is valid; and
    determining whether the page is allocated according to the FAT information.

11. The method of claim 10, wherein selectively copying the page from the first block to the second block further comprises:
    upon determining that the page is valid and allocated according to the FAT information, copying the page from the first block to the second block.

12. The method of claim 10, wherein selectively copying the page from the first block to the second block further comprises:
    upon determining that the page is marked for deletion or not allocated according to the FAT information, terminating the merge operation without copying the page from the first block to the second block.

13. The method of claim 8, further comprising:
selectively copying another page from a third block to the second block.

14. The method of claim 13, wherein the first block comprises a data block located in a data region of the flash memory;
the second block comprises a data block located in the data region of the flash memory; and,
the third block comprises a log block located in a log region of the flash memory device.

15. The method of claim 8, further comprising:
running a flash translation layer in a working memory of the controller to control the reading of the file allocation table (FAT) information and the selectively copying the page from the first block in the flash memory to the second block in the flash memory based on the FAT information.

* * * * *